(12) United States Patent
Khoury

(10) Patent No.: US 9,742,995 B2
(45) Date of Patent: Aug. 22, 2017

(54) RECEIVER-CONTROLLED PANORAMIC VIEW VIDEO SHARE

(71) Applicant: Microsoft Corporation, Redmond, WA (US)

(72) Inventor: Issa Khoury, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 14/221,902

(22) Filed: Mar. 21, 2014

(65) Prior Publication Data

US 2015/0271401 A1    Sep. 24, 2015

(51) Int. Cl.
| | |
|---|---|
| H04N 9/43 | (2006.01) |
| H04N 5/232 | (2006.01) |
| H04N 21/2343 | (2011.01) |
| H04N 7/00 | (2011.01) |

(52) U.S. Cl.
CPC ......... *H04N 5/23238* (2013.01); *H04N 5/232* (2013.01); *H04N 21/23439* (2013.01)

(58) Field of Classification Search
CPC .................................. H04N 9/43; H04N 7/00
USPC ........................................ 386/36, 34, 38, 39
See application file for complete search history.

(56) References Cited

U.S. PATENT DOCUMENTS

| | | | |
|---|---|---|---|
| 6,356,297 B1 | 3/2002 | Cheng et al. | |
| 7,999,842 B1* | 8/2011 | Barrus | H04N 5/2259 348/37 |
| 8,059,170 B2 | 11/2011 | Hii et al. | |
| 8,164,655 B2 | 4/2012 | Lablans | |
| 2006/0177150 A1* | 8/2006 | Uyttendaele | G06T 3/4038 382/284 |
| 2007/0186238 A1* | 8/2007 | Schrager | G06F 3/04815 725/35 |
| 2010/0182453 A1* | 7/2010 | Nagai | H04N 5/2356 348/231.2 |
| 2011/0316963 A1 | 12/2011 | Li et al. | |
| 2012/0169829 A1 | 7/2012 | Wei et al. | |

(Continued)

FOREIGN PATENT DOCUMENTS

| | | |
|---|---|---|
| EP | 2018049 | 1/2009 |
| EP | 2112815 | 10/2009 |

OTHER PUBLICATIONS

International Search Report and Written Opinion for International Application No. PCT/US2015/021126, 9 pages, mailed Jul. 8, 2015.

(Continued)

*Primary Examiner* — Daquan Zhao
(74) *Attorney, Agent, or Firm* — Klarquist Sparkman, LLP

(57) ABSTRACT

Systems and methods for constructing a live panoramic view from real-time streaming digital image data may include, by a computing device in real-time and for each identified digital image of a plurality of received digital images, a location of the received digital image may be determined within a panoramic view. The panoramic view may be updated with the received digital image based on the determined location, and the updated panoramic view may be displayed. The plurality of digital images may include standard video frames and/or optimized video frames received with the real-time streaming digital image data. The optimized video frames may be captured with one or more associated imaging parameters optimized for use in the panoramic view.

20 Claims, 11 Drawing Sheets

(56) References Cited

U.S. PATENT DOCUMENTS

| | | |
|---|---|---|
| 2012/0262540 A1 | 10/2012 | Rondinelli et al. |
| 2013/0021433 A1 | 1/2013 | Belsarkar et al. |
| 2013/0057546 A1* | 3/2013 | Watanabe ............. G06T 3/4038 345/419 |
| 2013/0242036 A1 | 9/2013 | Gorzynski et al. |
| 2013/0250121 A1 | 9/2013 | Piran et al. |
| 2013/0300819 A1 | 11/2013 | Halavy |
| 2013/0307922 A1 | 11/2013 | Chou et al. |

OTHER PUBLICATIONS

Fujihashi, et al., "A Preliminary Study on Multi-view Video Streaming over Underwater Acoustic Networks", In IEEE International Underwater Technology Symposium, Mar. 5, 2013, 5 pages.

International Preliminary Report of Patentability for International Application No. PCT/US2015/021126, 15 pages, mailed Mar. 10, 2016.

* cited by examiner

RECEIVER-CONTROLLED PANORAMIC VIEW VIDEO SHARE

BACKGROUND

As computing technology has advanced, increasingly powerful mobile devices have become available. For example, smart phones have become commonplace. The mobility of such devices has resulted in different types of functionality being developed, such as camera-based functionality, in which one or more built-in video cameras (e.g., rear-facing and/or front-facing cameras) may be used to take photographs and/or movies. Additionally, built-in video cameras are being increasingly used in video call-type applications. However, video calls are often a "see-what-I-see" type of stream, in which one party (the sender) uses the mobile device to show the other party (the receiver) what view the sender is seeing. In this situation, the person showing the view (the sender) decides what the other party (the receiver) is seeing at any given time. The receiving party has limited capability as they can only verbalize/indicate what they would like to see or where the sender needs or should point the camera of the sending mobile device. In this regard, in instances when the sender's view includes large scenery, the observer (the receiver) gets a small tunnel view at any given time, dictated by the view the camera of the sending mobile device is capable of capturing and sending to the receiving mobile device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, systems and methods for constructing a live panoramic view from real-time streaming digital image data may include, by a computing device in real-time and for each identified digital image of a plurality of received digital images, a location of the received digital image may be determined within a panoramic view. The panoramic view may be updated with the received digital image based on the determined location, and the updated panoramic view may be displayed. The plurality of digital images may include standard video frames and/or optimized video frames received with the real-time streaming digital image data. The optimized video frames may be captured with one or more associated imaging parameters optimized for use in the panoramic view.

In accordance with one or more aspects, a computer-readable storage medium having instructions thereon for executing a method for constructing a live panoramic view from streaming digital video data may be used. The method may include receiving at the computing device, the streaming video data which includes a plurality of video frames. The streaming video data may include a plurality of video frames starting with a beginning video frame and concluding with a ending video frame. A start indicator associated with a first video frame of the plurality of video frames may be detected. An end indicator associated with a subsequent second video frame of the plurality of video frames may be detected. The start indicator may be subsequent to the beginning video frame and the end indicator may be preceding the ending video frame. A panoramic view stored at the computing device may be updated, in real-time, based on video data streamed between the first and second video frames. The panoramic view may be displayed while receiving the streaming video data.

In accordance with one or more aspects, a method for constructing a live panoramic view from streaming digital video data may include, at a computing device and while receiving the streaming video data from a video data source device, a panoramic view may be generated using at least one of a plurality of video frames in the streaming video data. The panoramic view may be dynamically updated based on video information within at least another one of the plurality of video frames. A current version of the panoramic view may be streamed on a display of the computing device. A video stream of the current version of the panoramic view may be output in real-time to the video data source device.

As described herein, a variety of other features and advantages can be incorporated into the technologies as desired.

BRIEF DESCRIPTION OF THE DRAWINGS

The patent or application file contains at least one drawing executed in color. Copies of this patent or patent application publication with color drawing(s) will be provided by the US Patent and Trademark Office upon request and payment of the necessary fee.

DETAILED DESCRIPTION

As described herein, various techniques and solutions can be applied for receiver-controlled panoramic view video share capabilities, which improve the drawbacks of conventional video sharing. More specifically, an observer at a receiving device may be provided with a panoramic (or composite) view that is larger than what the video camera of the sending device can capture at any given time. Additionally, the observer at the receiving device may be provided with interactive capabilities in relation to a panoramic view constructed with video frame information received from the sending device (i.e., the observer may control, at any given time, what they want to look at beyond merely indicating to the sender where to point the camera.) The receiver-controlled panoramic view video share functionalities may be based on maintaining (e.g., storing or buffering) one or more portions of received standard and/or optimized video frames (e.g., using real-time streaming video), building a larger panoramic view using the received frames, allowing an observer at the receiving device to pan through the constructed panoramic view, and providing the observer at the receiving device a user interface to switch between the panoramic view and a view of what is currently being viewed at the sending device (and currently being streamed and received at the receiving device), to name a few.

As used herein, the term "standard" video frame refers to video frames captured with video parameters (e.g., frame rate, resolution, etc.) used for streaming video. For example, "standard" frames may be captured using lower resolution and lower shutter speed. As used herein, the term "optimized video frames" may refer to video frames that have been captured using image settings optimized for panoramic views (e.g., the video frames have been captured using resolution, shutter speed, and aperture priority used when taking panoramic images). For example, "optimized video frames" may be captured using higher resolution and optimal shutter speed, which are imaging parameters optimized for creating panoramic photo/image.

Figure 1:
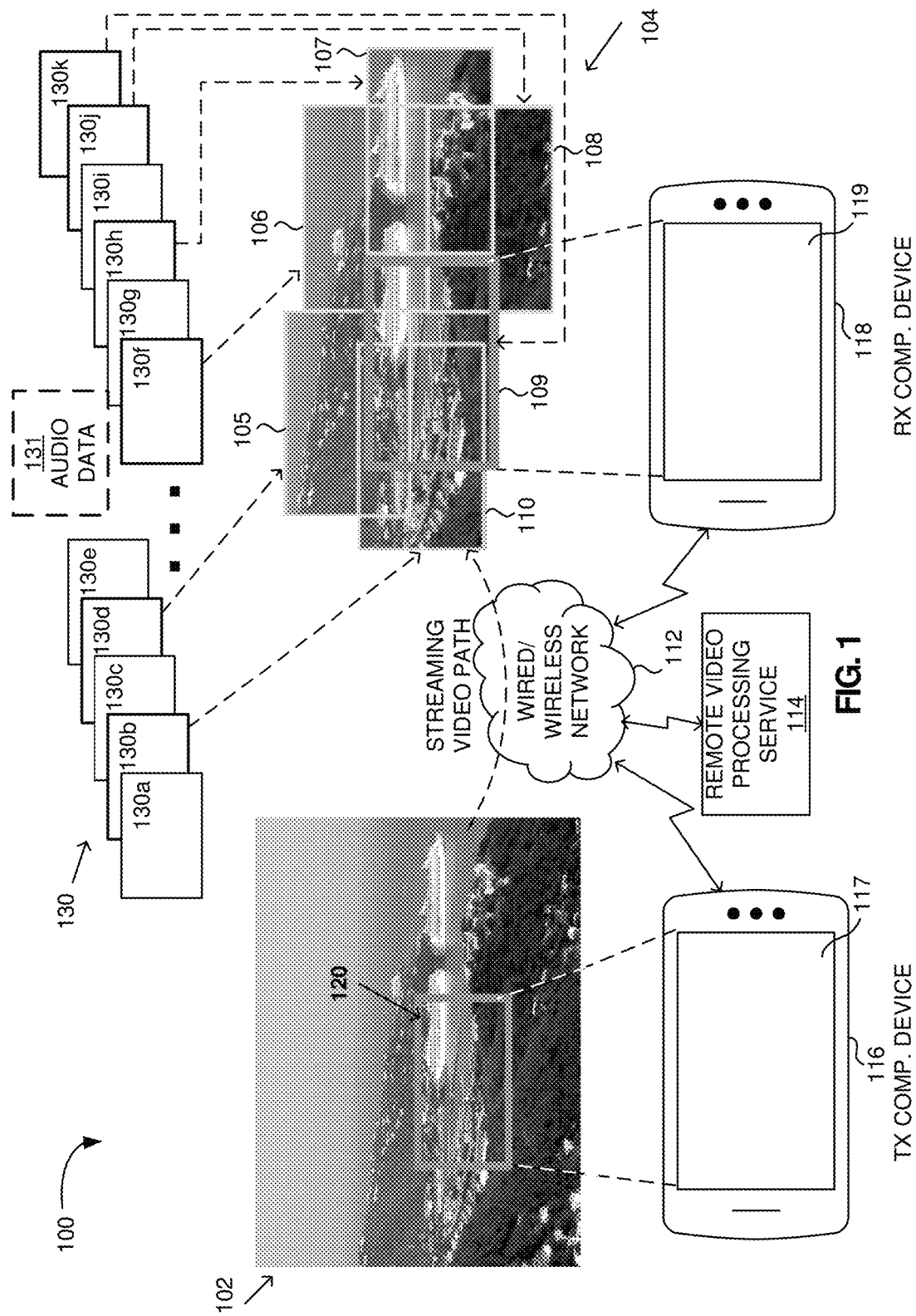
FIG. 1 illustrates an example system in which panoramic view video share can be used, in accordance with an example embodiment of the disclosure.

FIG. 1 illustrates an example system in which panoramic view video share can be used, in accordance with an example embodiment of the disclosure. Referring to FIG. 1, the example system 100 may comprise a transmitting (Tx) computing device 116 and a receiving (Rx) computing device 118. The computing devices 116 and 118 may include a handset, a smartphone, a tablet, a laptop, and/or another handheld or portable device. Additionally, each computing device 116 and 118 may include device screen 117 and 119, respectively. The two computing devices may be communicatively coupled with each other and with a remote video processing service 114 via a wired and/or wireless network 112 (which may include the Internet as well as other wired/wireless networks). In some implementations, the receiving computing device 118 may be a computing device that is not typically portable (e.g., a desktop computer).

In operation, the two computing devices 116 and 118 may be communicatively coupled so that standard and/or optimized video frames (e.g., frames 130) may be streaming in real-time from the Tx device 116 to the Rx device 118 (as indicated by the "streaming video path" in FIG. 1). An overall (main) view 102 represents the sender's view (i.e., a view seen by the user 116), and view 120 represents a portion of the sender's view 102, which is the view that is currently being captured and streamed by the Tx computing device 116. For example, if the Tx computing device 116 has its camera turned ON and is streaming video data (e.g., frames 130) to the Rx computing device 118, the view 120 represents what is displayed on screen 117 of device 116.

Constructing Panoramic View at the Receiving Device

As the Tx device 116 moves around trying to capture multiple portions of the overall view 102, the current view 120 will also move around (and stay within) the view 102, allowing the device 116 to capture a plurality of frames (e.g., 130). The device 116 may be in a mode (e.g., burst still photographs mode, video mode, and so forth) where standard video frames and/or optimized video frames are captured by the device camera and streamed in real-time to Rx device 118 as a plurality of streaming frames 130 (e.g., 130a, . . . , 130k). In this regard, one or more of the plurality of frames 130 may be video frames that have been optimized (e.g., the frames have been taken using video individual digital photographs), while other frames of the plurality of frames may be video frames (e.g., digital video frames or digital video pictures).

As the plurality of frames 130 are streamed to the Rx device 118, the panoramic view 104 may be constructed and/or updated at the device 118 using one or more of the streamed frames 130. More specifically, assuming frame 130a is streamed first, Rx device 118 may construct the panoramic view 104 using views 110, 105, 106, 107, 108, and 109, which correspond to streamed frames 130b, 130d, 130f, 130h, 130j, and 130k, respectively.

Initially, when Tx device 116 is viewing frame 130b, frame 130b is streamed in real-time to Rx device 118. When frame 130b is received, it may be buffered at device 118 and the panoramic view 104 may be represented only with view 110 corresponding to frame 130b. As the Tx device 116 moves within view 102, the current view 120 also moves and the device 116 captures frame 130d, which is then streamed in real-time to Rx device 118. When frame 130d is received, it may be buffered at device 118 and the panoramic view 104 may be expanded to include view 105 corresponding to frame 130d. More specifically, the device 118 may determine a portion of the newly received frame 130d that is non-overlapping with frame 130b, and may add the non-overlapping portion of frame 130d onto the current version of the panoramic view 104 (thereby expanding the panoramic view 104 with video data that is within the frame 130d but not within frame 130b).

Similarly, as the Tx device 116 moves within view 102, the current view 120 also moves and the device 116 captures additional frames 130f, 130h, 130j, and 130k, which are streamed in real-time to Rx device 118. When frames 130f, 130h, 130j, and 130k are received, they may be buffered at device 118 and the current panoramic view 104 (e.g., as buffered at device 118) may be further expanded to include non-overlapping video data from views 106-109 corresponding to frames 130f, 130h, 130j, and 130k. More specifically, the device 118 may determine one or more portions of the newly received frames 130f, 130h, 130j, and 130k that are non-overlapping with the panoramic view 104, and may add the non-overlapping portions of frames 130f, 130h, 130j, and 130k onto the current version of the panoramic view 104 (thereby expanding the panoramic view 104 with video data that is within the frames 130f, 130h, 130j, and 130k but not within any previously received frames used to construct the panoramic view 104).

As seen in FIG. 1, the latest (current) view being captured at the Tx device 116 is view 120, which corresponds to streamed frame 130k, and corresponding view 109 (which is the same as view 120) that is being streamed at the Rx device 118. In this regard, by buffering one or more of a plurality of streaming standard and/or optimized video frames (e.g., 130) received in rea-time, a larger (or expanded) panoramic view (e.g., 104) may be constructed and displayed by device 118.

The amount of standard and/or optimized video data being maintained (e.g., stored) at device 118 (or at off-chip storage) may depend on the amount of memory available at the device 118 (or at the off-chip storage). The memory and processing power of the system 100 may be augmented by, for example, a cloud service which may be used for offloading the buffering and/or video processing functionalities described herein. For example, the system 100 may use the remote video processing service 114, which may comprise suitable circuitry, logic, and/or code and may be operable to perform one or more of the buffering, video processing, and other functionalities in connection with the panoramic view video share functionalities described herein. Video processing service functionalities (as seen below in relation to FIG. 5) may be used as a remote service 114 (e.g., in a computing cloud environment), as part of the Rx device 118, and/or as part of the Tx device 116.

In an example embodiment, the Tx device 116 may also capture audio data 131 at the time of capturing the video frames 130. In this regard, the audio data 131 may be streamed together with the frames 130, and may be played back at the Rx device 118 when the corresponding frames 130 are displayed on screen 119. The audio data 131 may optionally be recorded at the Rx device 118 for subsequent use, or playback of the streaming (or recorded) audio data 131 may be an option (e.g., selected by a user of device 118).

Panning Through the Constructed Panoramic View. Continuous Background Updates.

Figure 2:
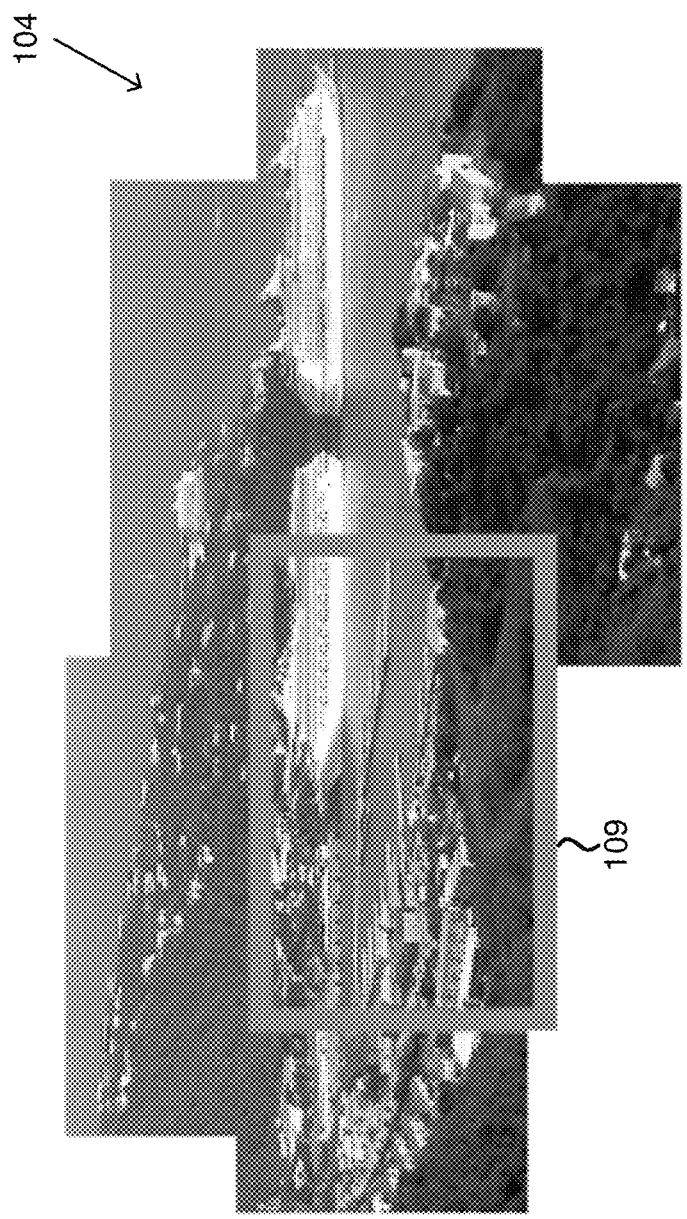
FIG. 2 illustrates an example real-time panoramic view at a receiving device, in accordance with one or more embodiments.

FIG. 2 illustrates an example real-time panoramic view at a receiving device, in accordance with one or more embodiments. Referring to FIG. 2, there is illustrated a current version of the panoramic view 104 and a location of the current view 109, which is being received at the Rx device 118, in real-time, from the Tx device 116. In accordance with an example embodiment of the disclosure, the Rx device 118 may provide a user the capability to pan through a current version of the panoramic view 104. For example, if view 109 is currently displayed on screen 119 of device 118 (view 109 representing the current view 120 being captured and streamed by the Tx device 116), a user at the Rx device 118 may be able to pan through and view any portion of the panoramic view 104. The panning may be achieved by using, for example, directional buttons on the device 118, "sliding" of the view 109 (if the screen 119 has touch-screen capabilities), zooming in or out of the panoramic view 104 (e.g., zooming out so the entire view 104 fits within the screen 119 or zooming in and focusing on a given portion of the view 104), and so forth. In this regard, the device 118 provides the user with the capability to pan through the constructed panoramic view 104 at any given time, while the device 118 may still be receiving real-time streaming standard and/or optimized video frames from the Tx device 116.

Since the receiving and buffering of received frames may be uninterrupted, the device 118 may continuously monitor the received frames for any non-overlapping (i.e., new) content that does not currently appear in the view 104, and may continuously update (i.e., expand/enlarge) the panoramic view with the non-overlapping image/video data received in real-time from device 116. Therefore, the continuous updating/enlarging of the panoramic view may be performed in the background, while the user of device 118 is viewing an area of the panoramic view 104 that is different from the currently received view 109. Even though received standard and/or optimized video frames (e.g., 130) may be buffered at device 118, such buffering may be temporary (e.g., until the image/video data is used for updating/enlarging the panoramic view 104). Once the received streaming image/video data is used for updating/enlarging the panoramic view 104, such previously received data may optionally be discarded from the buffer (or internal/external storage that may be used for storing the data) for purposes of efficient memory management.

In accordance with an example embodiment of the disclosure, the panoramic view 104 may be cropped so that a contiguous rectangle in portrait or landscape orientation may be generated for display at the Rx device 118 (and/or the Tx device 116). For example, the panoramic view 104 in FIG. 2 may be cropped on all four sides so that it does not have any empty/unfilled areas (e.g., the white space seen in FIG. 2 all around the view 104).

Switching Views at the Receiving Device Using PIP Functionalities

Figure 3:
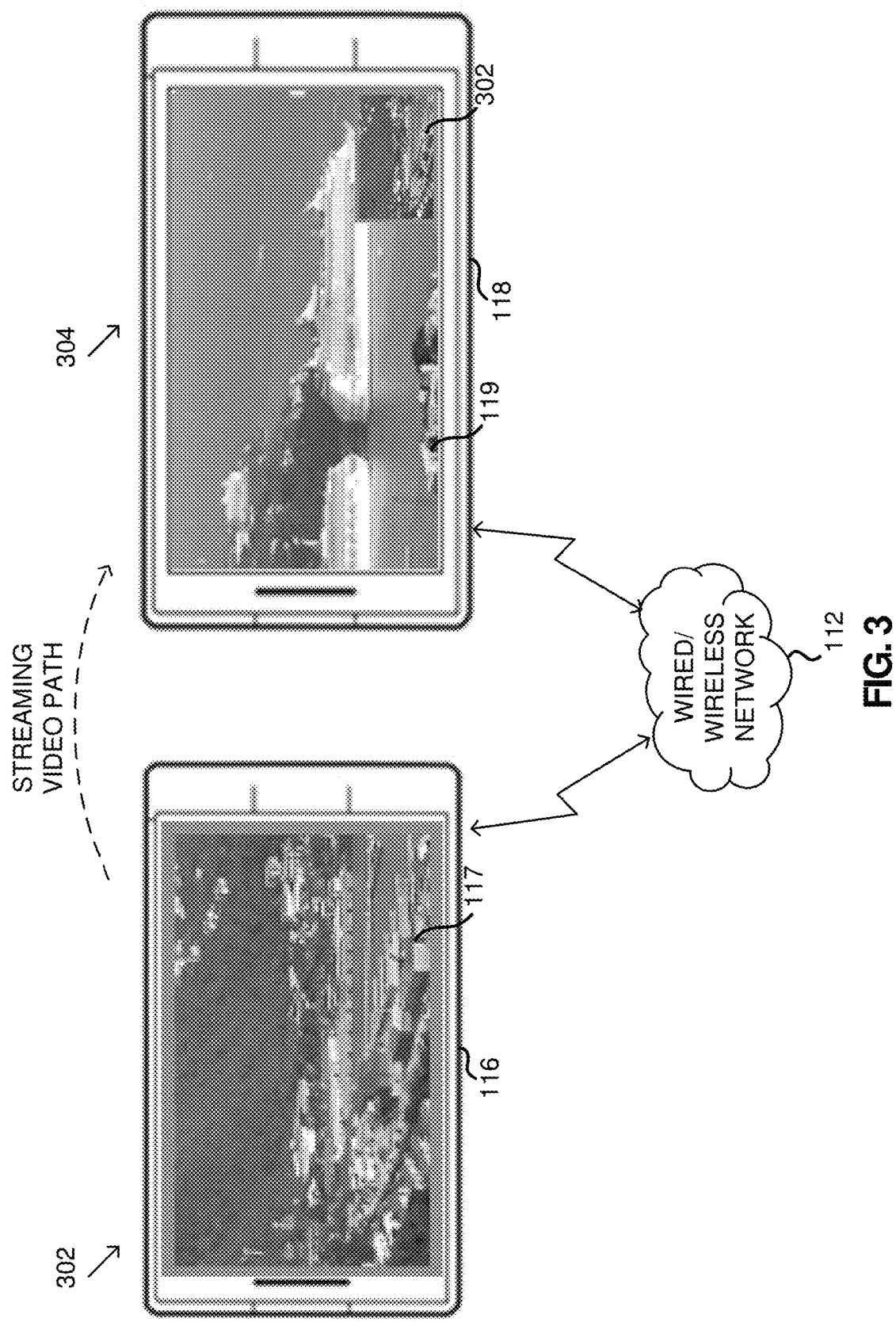
FIG. 3 illustrates an example system in which panoramic view video share can be used with picture-in-picture support for the receiving device, in accordance with an example embodiment of the disclosure.

FIG. 3 illustrates an example system in which panoramic view video share can be used with picture-in-picture support for the receiving device, in accordance with an example embodiment of the disclosure. Referring to FIGS. 1 and 3, the Tx device 116 may be capturing and streaming in real-time standard and/or optimized video frames of the view 302, which is displayed on device screen 117. While the image/video data of view 302 is streamed to the Rx device 118, a user at the Rx device 118 may be panning through the panoramic view 104 and viewing portions of the panoramic view 104 that were previously captured/streamed (by the Tx device 116) and received by the Rx device 118.

As seen in FIG. 3, the device screen 119 displays view 304 of an area of the panoramic view 104 which has been captured previously. In this case, the current video being streamed and received by the Rx device 118 pans outside the current view 304. In accordance with an example embodiment of the disclosure, the Rx device 118 may provide a user interface allowing the observer (i.e., user of device 118) to switch between viewing one or more previously-captured portions of the panoramic view 104 and the current view (e.g., 302) being received from the Tx device 116. Such user interfaces may include a software button, a screen double-tap, or any other shortcuts allowing the observer at device 118 to switch between viewing previously captured portions of the panoramic view 104 and the currently captured view 302. In other instances, the Rx device 118 may provide picture-in-picture ("PIP") functionalities and display the currently captured/streamed view 302 as a PIP window within the device screen 119, while displaying view 304 of previously captured-portion of the panoramic view 104. The observer may also be able to zoom in and out of the view 304 (or pan through other portions of the panoramic view 104), while the currently streamed view 302 is displayed as PIP.

As another option, the observer may switch between the PIP and the view 304 so that the currently streamed view 302 is displayed on the entire screen 119, and a previously captured portion of the panoramic view 104 can be displayed as PIP within screen 119. Any display of the panoramic view 104 may be zoomed in or out of at any given time while the currently streamed view is being received by the device 118 (e.g., zooming in and out of the view 304 may take place while the view 304 is displayed on the entire screen 119 or as a PIP within the screen 119). For example, the observer may zoom out so that the entire panoramic view 104 is displayed within the screen 119, while the currently streamed view 302 is displayed as a PIP. In this instance, the observer may observe how the panoramic view 104 is updated/expanded in real-time (as the Tx device 116 streams standard and/or optimized video frames with data that is non-overlapping with the panoramic view 104).

Providing PIP Functionalities at Both Devices

Figure 4:
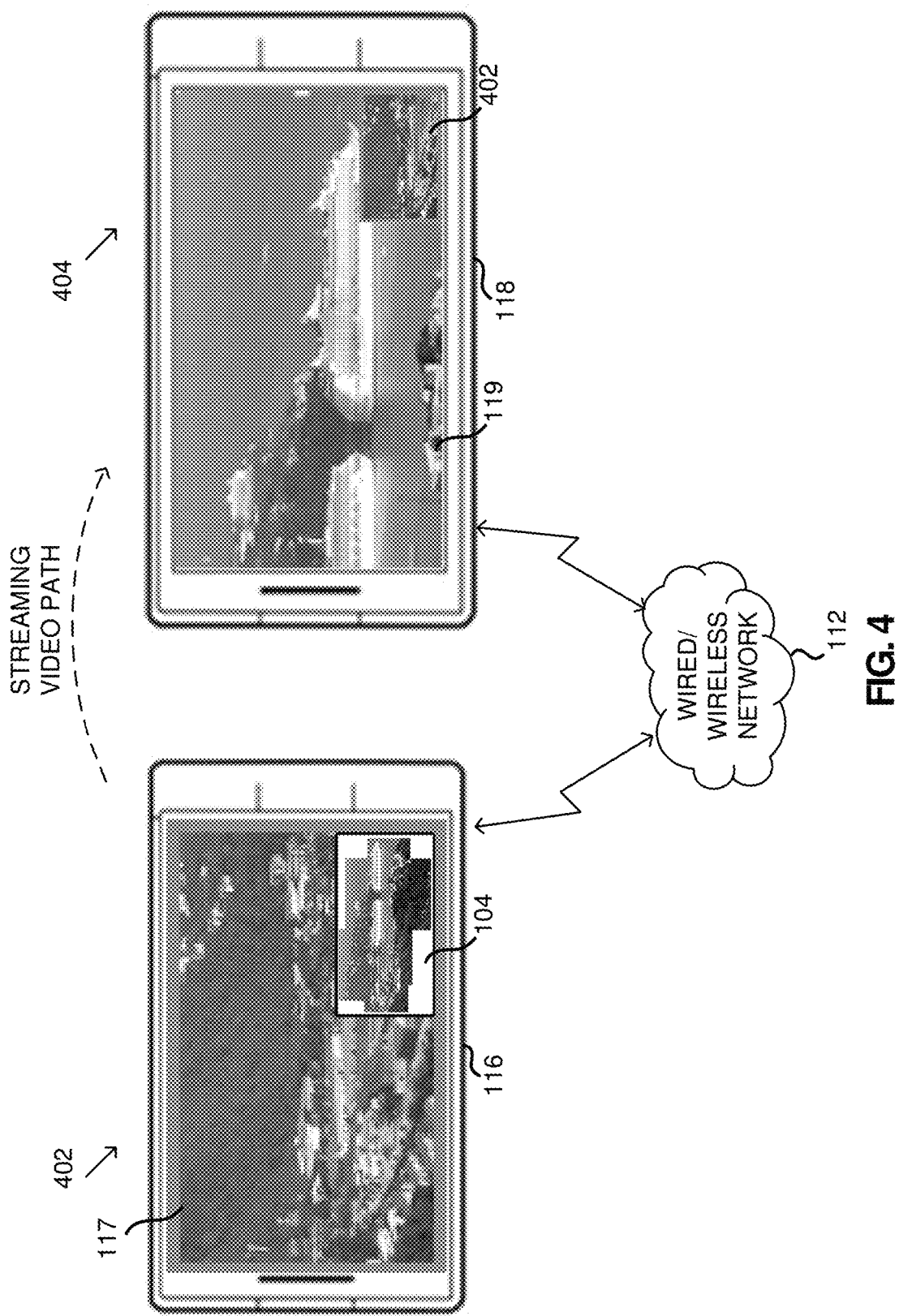
FIG. 4 illustrates an example system in which panoramic view video share can be used with picture-in-picture support for both the sending and the receiving devices, in accordance with an example embodiment of the disclosure.

FIG. 4 illustrates an example system in which panoramic view video share can be used with picture-in-picture support for both the sending and the receiving devices, in accordance with an example embodiment of the disclosure. Referring to FIGS. 1 and 4, the Tx device 116 may be capturing and streaming in real-time standard and/or optimized video frames of the view 402, which is displayed on device screen 117. While the image/video data of view 402 is streamed to the Rx device 118, a user at the Rx device 118 may be panning through the panoramic view 104 and viewing portions of the panoramic view 104 (e.g., view 404) that were previously captured/streamed (by the Tx device 116) and received by the Rx device 118.

As seen in FIG. 4, the device screen 119 displays view 404 of an area of the panoramic view 104 which has been captured previously. In this case, the current video being streamed and received by the Rx device 118 pans outside the current view 404. In accordance with an example embodiment of the disclosure, both devices 116 and 118 may use PIP functionalities to enhance panoramic view video share. The Rx device 118 may provide picture-in-picture ("PIP") functionalities and display the currently captured/streamed view 402 as a PIP window within the device screen 119, while displaying view 404 of previously captured-portion of the panoramic view 104. The observer at device 118 may also be able to zoom in and out of the view 404 (or pan through other portions of the panoramic view 104), while the currently streamed view 402 is displayed as PIP.

The Tx device 116 may also provide PIP functionality and display the current panoramic view 104, as maintained (e.g., stored or managed) by the Rx device 118. In this regard, the sender (e.g., user of the Tx device 116) may observe the current status of the panoramic view 104 (e.g., as a PIP in the screen 117) and, for example, pan the camera of device 116 to areas of the panoramic view 104 that may be expanded (e.g., the white, or unfilled, portions of the panoramic view 104, as seen in FIG. 4). This may be useful for the sender at the Tx device 116 to know where to point the camera of device 116 (to complete the panoramic view 104) and to know when to stop streaming (e.g., when the panoramic view 104 has been completed). Additionally, both devices 116 and 118 may provide a user interface (e.g., double tap) to switch between the main view on the device screen and the view displayed in the PIP window.

Figure 5:
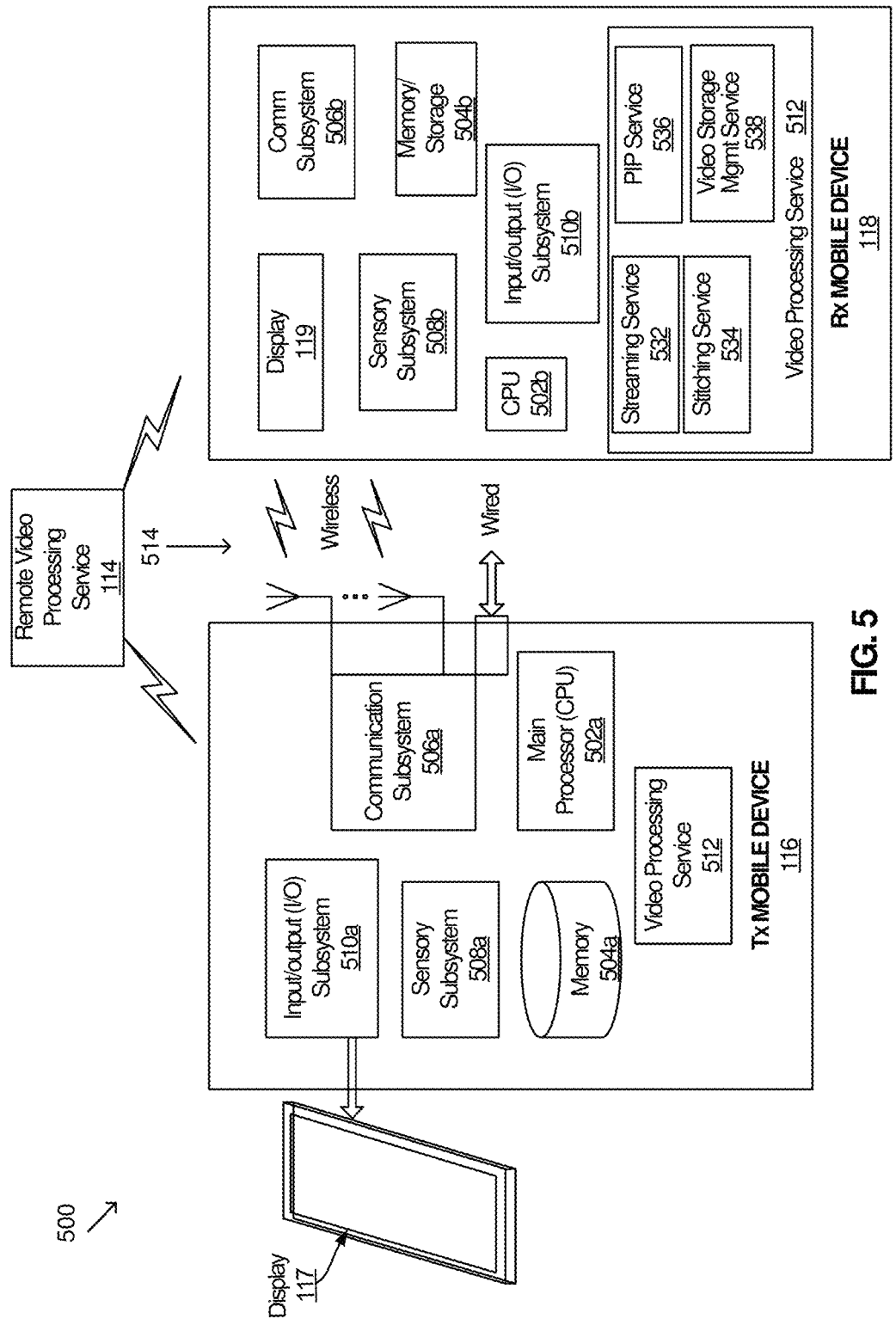
FIG. 5 illustrates a block diagram of example architecture with transmitting and receiving devices implementing panoramic view video share using a video processing service, in accordance with an example embodiment of the disclosure.

FIG. 5 illustrates a block diagram of example architecture with transmitting and receiving devices implementing panoramic view video share using a video processing service, in accordance with an example embodiment of the disclosure. Referring to FIG. 5, the example architecture 500 may comprise the Tx computing device 116, the Rx computing device 118, and the remote video processing service 114.

The computing devices 116 and 118 may each include a handset, a smartphone, a tablet, a laptop, and/or another handheld or portable device. Additionally, the computing devices 116 and 118 may each comprise, for example, a main processor 502 (502a in device 116 and 502b in device 118), a system memory 504 (504a and 504b, respectively), a communication subsystem 506 (506a and 506b, respectively), a sensory subsystem 508 (508a and 508b, respectively), an input/output (I/O) subsystem 510 (510a and 510b, respectively), and displays 117 and 119, respectively.

The main processor 502a/502b may comprise suitable logic, circuitry, interfaces, and/or code that may be operable to process data, and/or control and/or manage operations of the computing devices 116/118, and/or tasks and/or applications performed therein in connection with panoramic view video share functionalities described herein. In this regard, the main processor 502 (502a/502b) may be operable to configure and/or control operations of various components and/or subsystems of the computing devices (116 and 118, respectively), by utilizing, for example, one or more control signals. The main processor 502 enables running and/or execution of applications, programs and/or code, which may be stored, for example, in the system memory 504 (504a/504b). In some instances, one or more of the applications running and/or executing on the computing devices (116 and 118, respectively) may generate and/or update video content that may be rendered via the displays 117/119.

The system memory 504 may comprise suitable logic, circuitry, interfaces, and/or code that may enable permanent and/or non-permanent storage, buffering, and/or fetching of data, code and/or other information, which may be used, consumed, and/or processed. In this regard, the system memory 504 may comprise different memory technologies, including, for example, read-only memory (ROM), random access memory (RAM), Flash memory, solid-state drive (SSD), and/or field-programmable gate array (FPGA). The system memory 504 may store, for example, configuration data, which may comprise parameters and/or code, comprising software and/or firmware. The memory 504 (504a and/or 504b) may also store/buffer one or more of the streamed video frames 130 as well as the panoramic view 104 as it is updated/expanded in real-time.

The communication subsystem 506 (506a/506b) may comprise suitable logic, circuitry, interfaces, and/or code operable to communicate data from and/or to the computing device, such as via one or more wired and/or wireless connections 514. The communication subsystem 506 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing devices 116/118, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 506 may provide wired and/or wireless connections to, for example, the remote video processing service 114 via the wired and/or wireless connections 514.

The sensory subsystems 508 (508a/508b) may each comprise suitable logic, circuitry, interfaces, and/or code for obtaining and/or generating sensory information, which may relate to the corresponding computing device (116/118), its user(s), and/or its environment. For example, the sensory subsystems 508 may each comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystems 510 (510a/510b) may comprise suitable logic, circuitry, interfaces, and/or code for enabling user interactions with the corresponding computing device (116/118), enabling obtaining input from user(s) and/or to providing output to the user(s). The I/O subsystems 510 may each support various types of inputs and/or outputs, including, for example, video, audio, and/or textual. In this regard, dedicated I/O devices and/or components, external to or integrated within the computing devices (116/118), may be utilized for inputting and/or outputting data during operations of the I/O subsystems 510. Exemplary I/O devices may comprise one or more built-in cameras (e.g., front-facing and/or rear-facing camera), one or more displays, mice, keyboards, touchscreens, voice input interfaces, and other input/output interfaces or devices. With respect to video outputs, the I/O subsystems 510 may each be operable to generate and/or process video content, graphics, and/or textual data, and/or generate video frames based thereon for display, via the displays 117/119 for example.

The displays 117/119 may comprise suitable logic, circuitry, interfaces and/or code that may enable displaying of video content, which may be handled and/or processed via the I/O subsystems 510a/510b, respectively. The displays 117/119 may be used in outputting video data during panoramic view video share, as described herein.

In accordance with an example embodiment of the disclosure, the Rx device 118 may also comprise a video processing service 512, which may comprise suitable circuitry, logic, and/or code (e.g., software applications) and may be operable to perform one or more still image and/or video data processing functionalities described herein in connection with panoramic view video share. The video processing service 512 may comprise, for example, a streaming service 532, a stitching service 534, a PIP service 536, and a video storage management service 538.

The streaming service 532 may comprise suitable circuitry, logic, and/or code and may be operable to manage streaming data, including receiving and processing of streaming data (e.g., streamed frames 130), as well as managing the transmission of streaming data. The stitching service 534 may comprise suitable circuitry, logic, and/or code and may be operable to compare one or more of the received frames 130 with a currently maintained/stored panoramic view 104 to determine whether any non-overlapping data has been received with the frames 130. If such non-overlapping data has been determined, the stitching service 534 may "stitch" it (or add it) to the panoramic view 104, thereby updating/expanding the panoramic view 104.

The PIP service 536 may comprise suitable circuitry, logic, and/or code and may be operable to provide PIP functionality with regard to one or more views available for display at the computing device 118 (e.g., as discussed above in reference to FIGS. 3-4). The video storage management service 538 may comprise suitable circuitry, logic, and/or code and may be operable to manage storage/buffering of the received streamed frames 130 and/or the panoramic view 104 within the memory 504b and/or any other memory used by device 118 (e.g., off-chip or attached memory).

In accordance with an example embodiment of the disclosure, one or more of the functionalities performed by the video processing service 512 may be implemented (and performed by) the Tx computing device 116 (as reflected in FIG. 5). For example, the Tx device 116 may perform at least a portion of the buffering and/or stitching functionalities in connection with the panoramic view video sharing described herein. One or more of the video processing service functionalities described herein may also be offloaded and performed by the remote video processing service 114.

Figure 6:
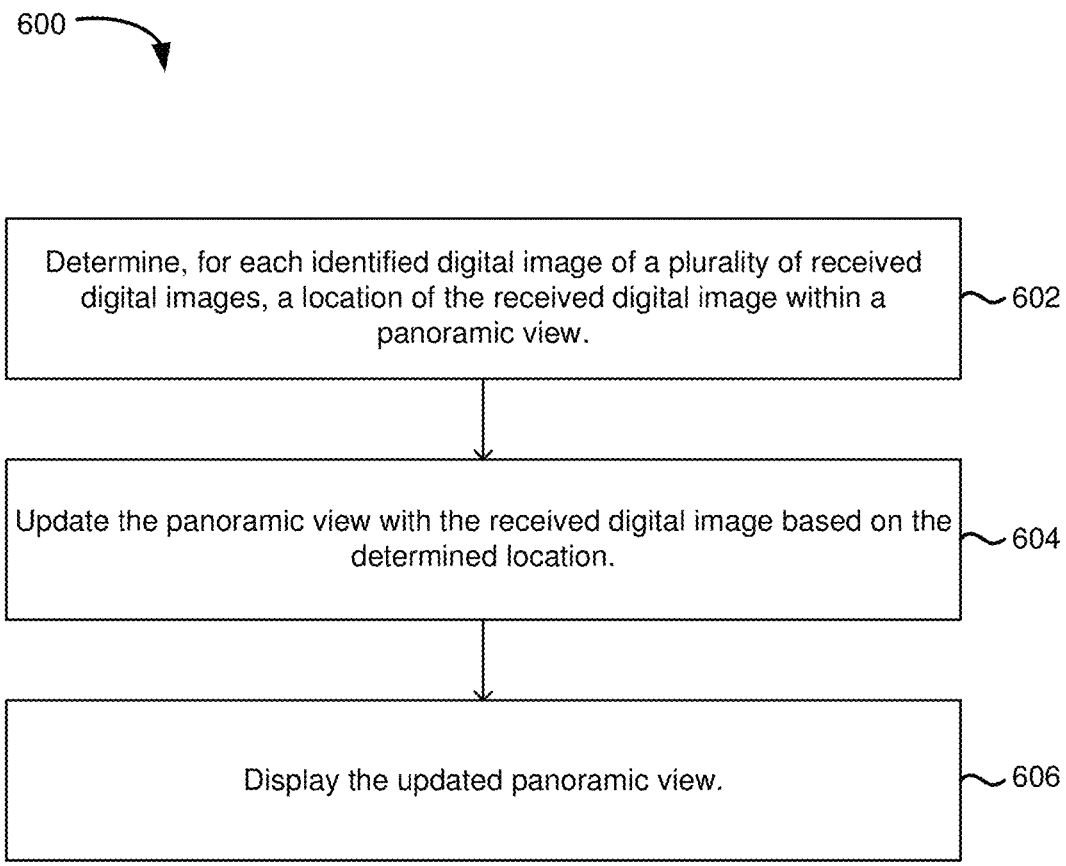
FIGS. 6-8 are flow diagrams illustrating example processes for constructing one or more live panoramic views from real-time streaming digital image data, in accordance with one or more embodiments.
Figure 7:
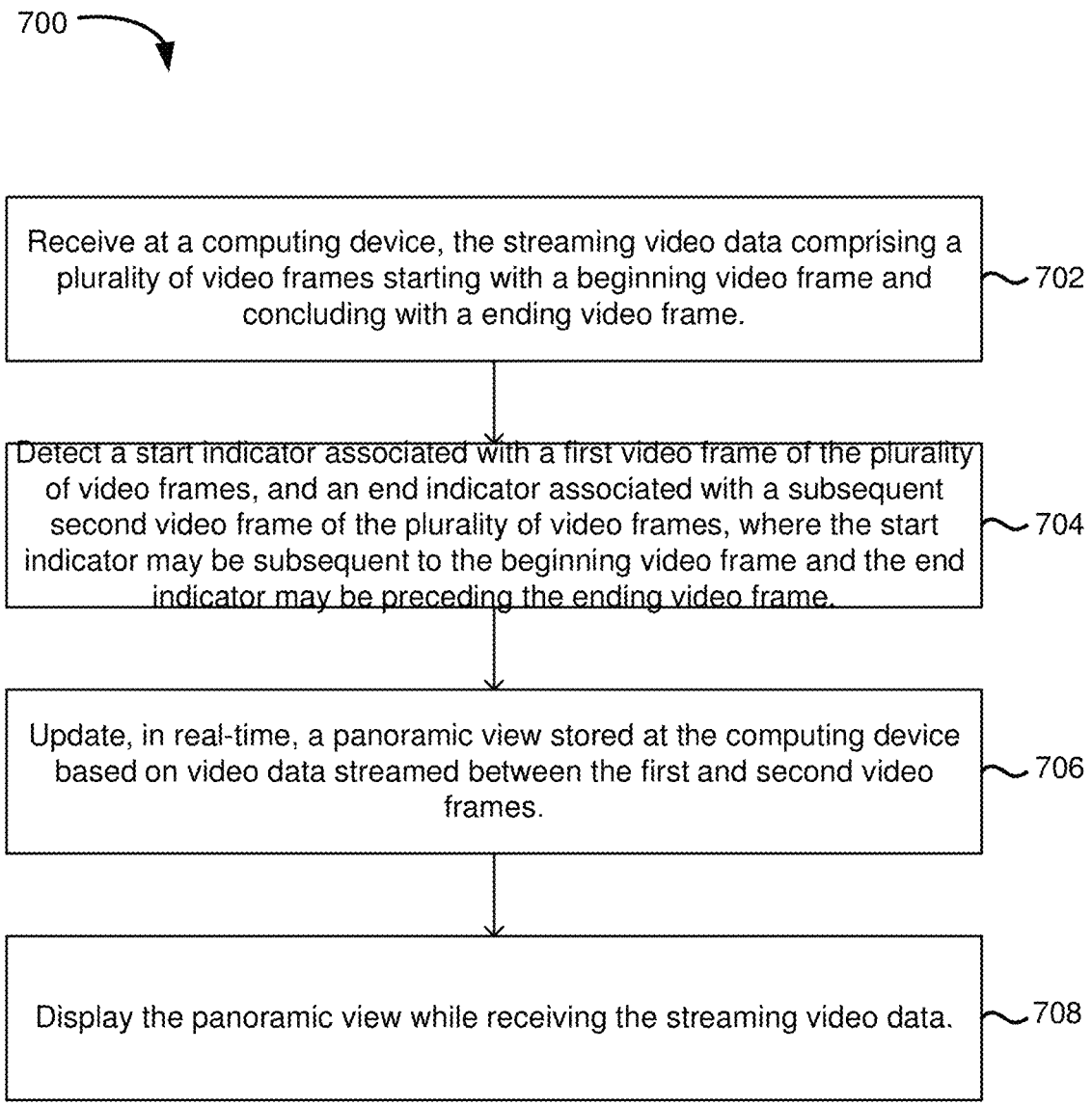
Figure 8:
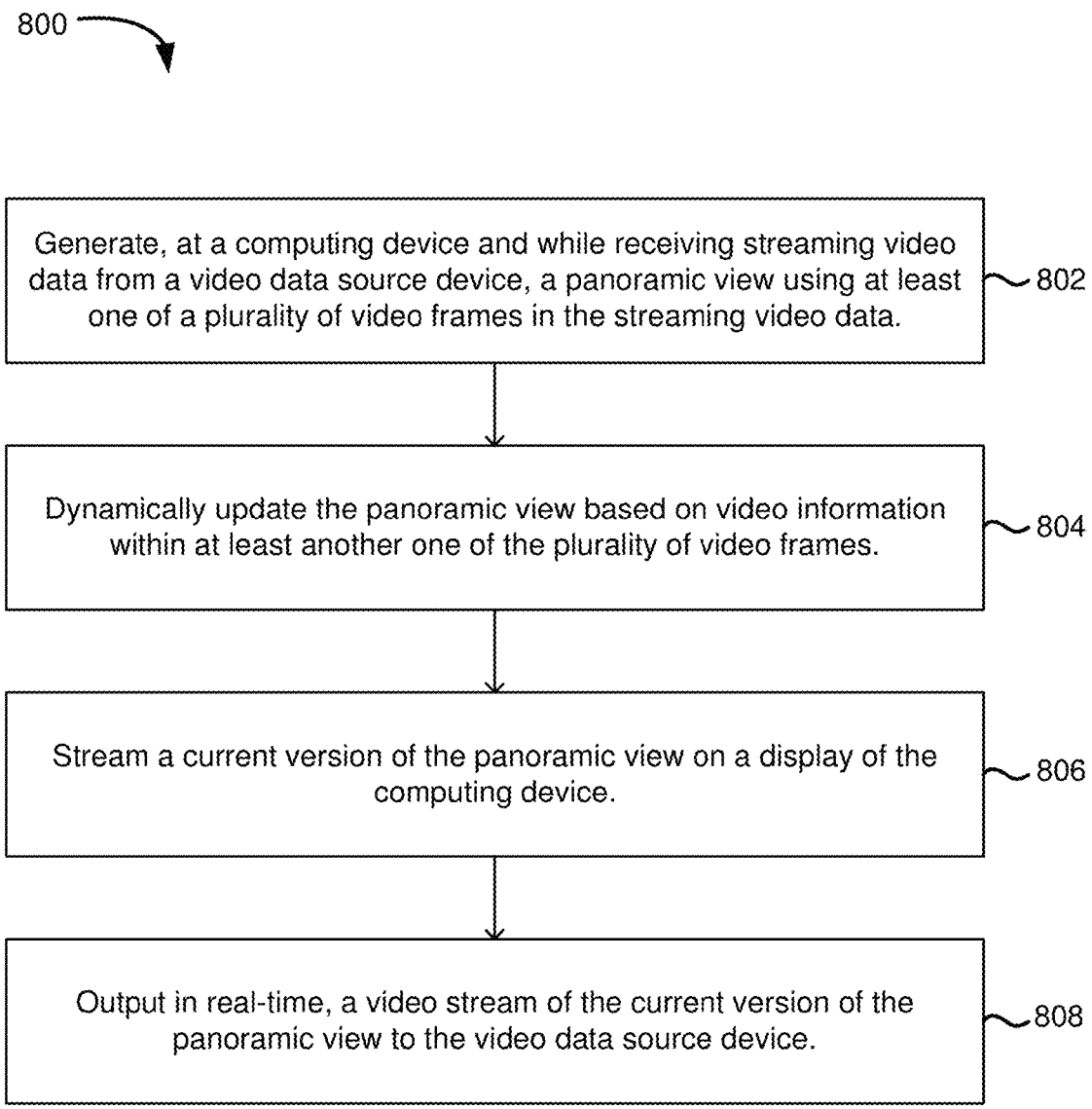

FIGS. 6-8 are flow diagrams illustrating example processes for constructing one or more live panoramic views from real-time streaming digital image data, in accordance with one or more embodiments. Referring to FIGS. 1-6, the example method 600 may start at 602, when a computing device may, in real-time and for each identified digital image of a plurality of received digital images, determining a location of the received digital image within a panoramic view. For example, the video processing service 512 of the Rx device 118 may, for each of the plurality of received frames 130, determine a location of the received digital image within the panoramic view 104. Functionalities of the video processing service 512 may be performed, at least in part, by the CPU 502b.

At 604, the video processing service 512 may update the panoramic view 104 with the received digital image based on the determined location. For example, prior to initiating receiving of streaming video, the panoramic view 104 may be blank. After receiving frames 130a-130b, the panoramic view 104 may comprise view 110 corresponding to frame 130b. After frame 130d is received by device 118, the video processing service 512 may determine the location of the frame 130d as view 105 within the panoramic view 104, any portions of frame 130d that are non-overlapping with the current panoramic view 104 (e.g., view 110) will be added on to the panoramic view 104 so it expands and includes views 110 and 105. At 606, the video processing service 512 may display the current version of the panoramic view 104 (as seen in FIGS. 1-2).

The plurality of digital images 130 comprise standard and/or optimized video frames received with the real-time streaming digital image data. In accordance with an example embodiment of the disclosure, for each current view 120, a plurality of still images or video frames may be taken (e.g., 130a-130c) of the same view being streamed by the Tx device 116. The video processing service 512 may then analyze the received still images and/or video frames and select one standard and/or optimized video frame for purposes of updating the panoramic view 104. The selecting of one of a plurality of still images and/or video frames associated with the same view streamed by device 116 may be based on video analysis, such as signal-to-noise ratio or other image analysis criteria which may be used to select the desired image and/or frame (in the specific example of frames 130a-130c, frame 130b is selected for inclusion as view 110 within the panoramic view 104).

In accordance with an example embodiment of the disclosure, streaming frames 130 may include a plurality of video frames (taken using one or more video settings) as well as a plurality of still images (taken using one or more settings for still images). For example, frames 130b, 130d, 130f, 130h, 130j, and 130k may be taken by the device 116 as still images, optimized for stitching into the panoramic view 104 (e.g., enhanced resolution, custom image size, etc.) The remaining frames 130a, 130c, 130e, 130g, and 130i may be taken as regular video frames.

If the plurality of digital images (e.g., 130) comprises still frames, updating of the panoramic view 104 with the received digital image may be based on a determined location of at least one of the still frames within the panoramic view 104. The video frames (e.g., 130a, 130c, 130e, 130g, and 130i) of the plurality of frames 130 may be captured using at least one streaming video setting, and the still frames (e.g., 130b, 130d, 130f, 130h, 130j, and 130k) may be captured using at least one still image setting. The at least one streaming video setting may include one or more of a streaming video frame rate, a key frame interval, streaming video resolution, and/or video width/height. The at least one still image setting may include one or more of still image screen format, still image resolution, and/or image width/height.

In accordance with yet another example embodiment of the disclosure, the video frames 130 may be part of a previously taken video (i.e., not a real-time streaming video). The previously taken video frames 130 may be transmitted from device 116 to device 118 and panoramic view processing may be performed at device 118. As an alternative, the previously taken video frames 130 may be available (e.g., as a stored video file or video file available on attached or remotely accessed storage) at device 118. A user of device 116 (or a user of device 118) may designate a start time instance, which may initiate updating of a panoramic view with the previously taken frames 130, and a finish instance, which may indicate a completion of the panoramic view 104.

The updating performed by the video processing service 512 may include, upon receipt of a first of the plurality of digital images (e.g., 130*b*), initializing the panoramic view 104 to be the same as the first of the plurality of digital images (e.g., view 110). Upon receipt of at least a subsequent one of the plurality of digital images (e.g., 130*d*, 130*f*, 130*h*, 130*j*, and 130*k*), the video processing service 512 may expand the panoramic view 104 (e.g., with views 105, 106, 107, 108, and 109, respectively) using video data within these subsequent digital images. The updating may take place automatically and without user intervention.

Referring to FIGS. 1-5 and 7, the example method 700 may start at 702, when a live panoramic view may be constructed by a computing device (e.g., 118) from streaming digital video data (e.g., 130) by receiving at the computing device, the streaming video data comprising a plurality of video frames (e.g., 130*a*, . . . , 130*k*), starting with a beginning video frame (e.g., 130*a*) and concluding with an ending video frame (e.g., 130*k*). At 704, the video processing service 512 may detect a start indicator associated with a first video frame of the plurality of video frames. For example, the start indicator (which may be subsequent to the beginning frame 130*a*) may be flag data (or any other type of data) within a preceding frame (e.g., indicator data within frame 130*b*, indicating frame 130*b* or a subsequent frame 130*c* should be used for constructing a panoramic view) or within the frame that is to be used as a first frame for the panoramic view update (i.e., the start indicator may be within frame 130*b* itself). Similarly, an end indicator (which may be preceding the ending frame 130*k*) may be used within the frames 130 to indicate the last frame to be used for updating the panoramic view 104 (e.g., an end indicator may be associated with frame 130*j* or a preceding frame). The end indicator may be associated with a subsequent second video frame (e.g., 130*j*) of the plurality of video frames. At 706, the video processing service 512 may then update, in real-time, the panoramic view 104 stored at the computing device 118 based on video data streamed between the first and second video frames (e.g., frames 130*b*, 130*d*, 130*f*, 130*h*, 130*j*, and 130*k*). At 708, the video processing service 512 may display the panoramic view 104 while receiving the streaming video data 130 (e.g., as illustrated and discussed in reference to FIGS. 3-4).

In accordance with an example embodiment of the disclosure, the start indicator and/or the end indicator may be selected manually by, e.g., the sender (i.e., user of the Tx device 116) or the receiver (i.e., user of the Rx device 118) in instances of streaming video. In other instances, a pre-recorded video may be used (e.g., sent from device 116 to device 118, or captured and recorded by device 118) to generate the panoramic view. In this case, the start and end indicators may still be selected manually (e.g., by a user). In yet another instance, the start and end indicators may be selected automatically (e.g., based on the start and end of the streaming or pre-recorded video, based on time spent video-recording certain area of a scene, or based on other criteria for automatic selection).

If a pre-recorded video is used, such video may be pre-recorded at, e.g., the Tx device 116, and the panoramic view may be generated at the time the video was recorded; or the pre-recorded video may be communicated to the Rx device 118 and the panoramic view 104 may be generated (and stored) at the Rx device 118.

Referring to FIGS. 1-5 and 8, the example method 800 may start at 802, when a computing device (e.g., 118) may construct a live panoramic view from streaming digital video data, by generating (while receiving the streaming video data from a video data source device 116) a panoramic view 104 using at least one (e.g., 130*b*) of a plurality of video frames in the streaming video data (130). At 804, the video processing service 512 may dynamically update the panoramic view 104, based on video information within at least another one of the plurality of video frames (e.g., 130*d*). At 806, the video processing service 512 may stream a current version of the panoramic view 104 on a display of the computing device 118 (e.g., as seen in FIG. 4). At 808, the video processing service 512 may output in real-time, a video stream of the current version of the panoramic view 104 back to the video data source device 116 (e.g., panoramic view 104 is displayed at the Tx device 116 as seen in FIG. 4).

Figure 9:
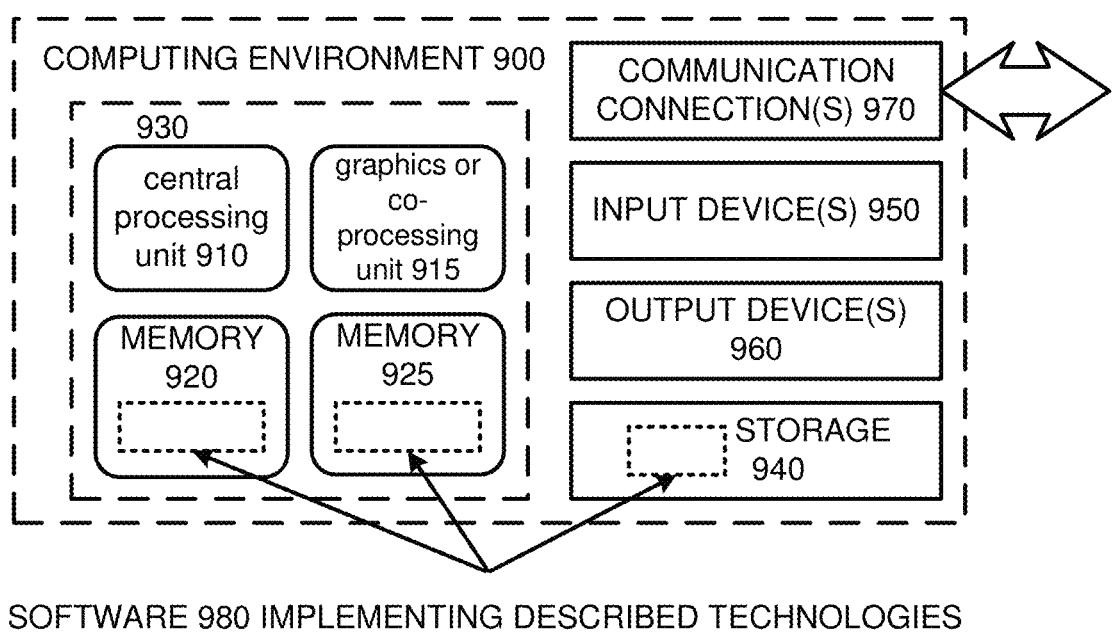
FIG. 9 is a diagram of an example computing system, in which some described embodiments can be implemented.

FIG. 9 is a diagram of an example computing system, in which some described embodiments can be implemented. The computing system 900 is not intended to suggest any limitation as to scope of use or functionality, as the innovations may be implemented in diverse general-purpose or special-purpose computing systems. With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may also have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 10:
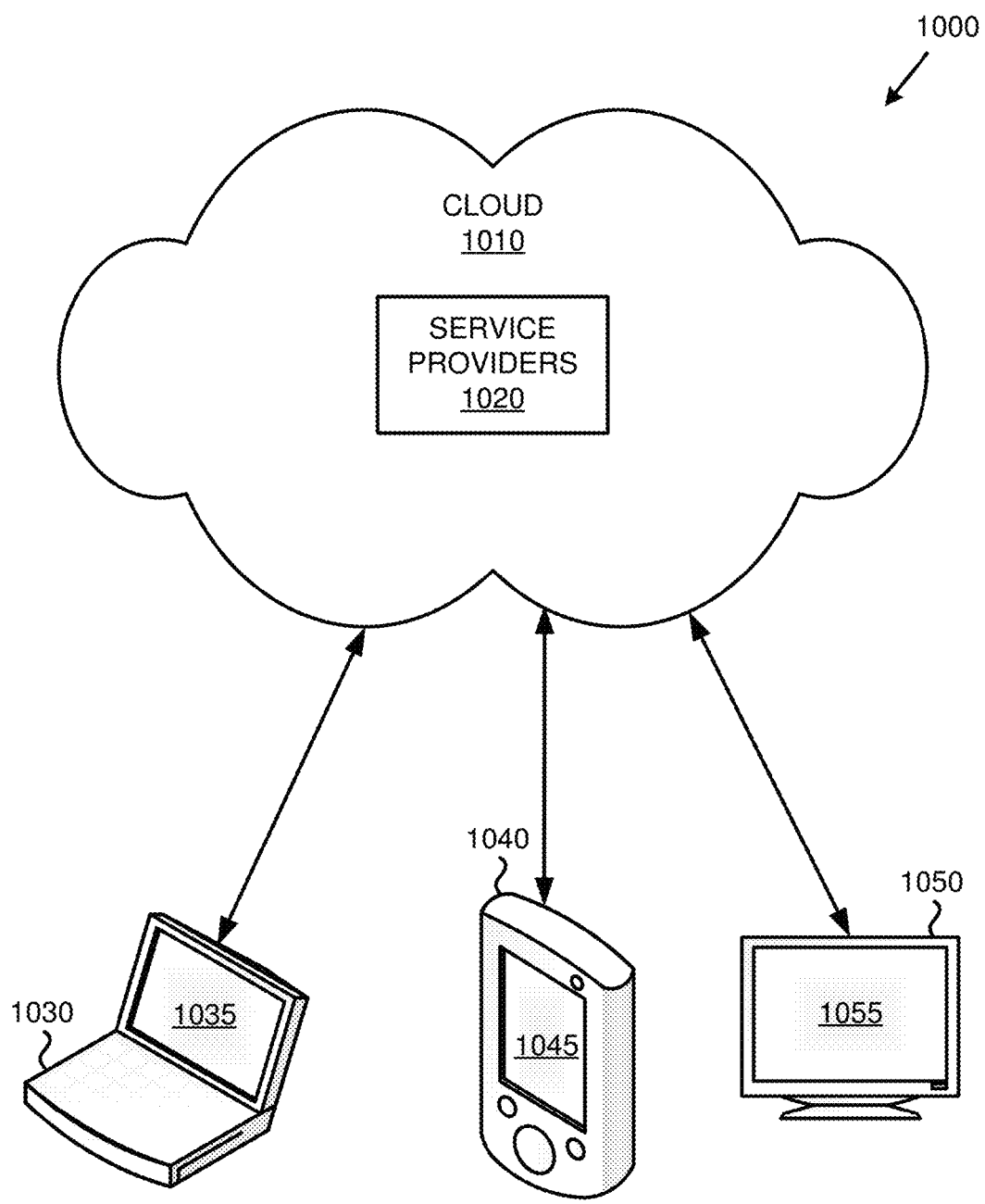
FIG. 10 illustrates a generalized example of a suitable cloud-supported environment, in which described embodiments, techniques, and technologies may be implemented.

FIG. 10 illustrates a generalized example of a suitable cloud-supported environment 1000, in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050), while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, and/or 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, and/or 1050).

In the example environment 1000, the cloud 1010 provides one or more of the technologies and solutions described herein to the various connected devices 1030, 1040, and/or 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Figure 11:
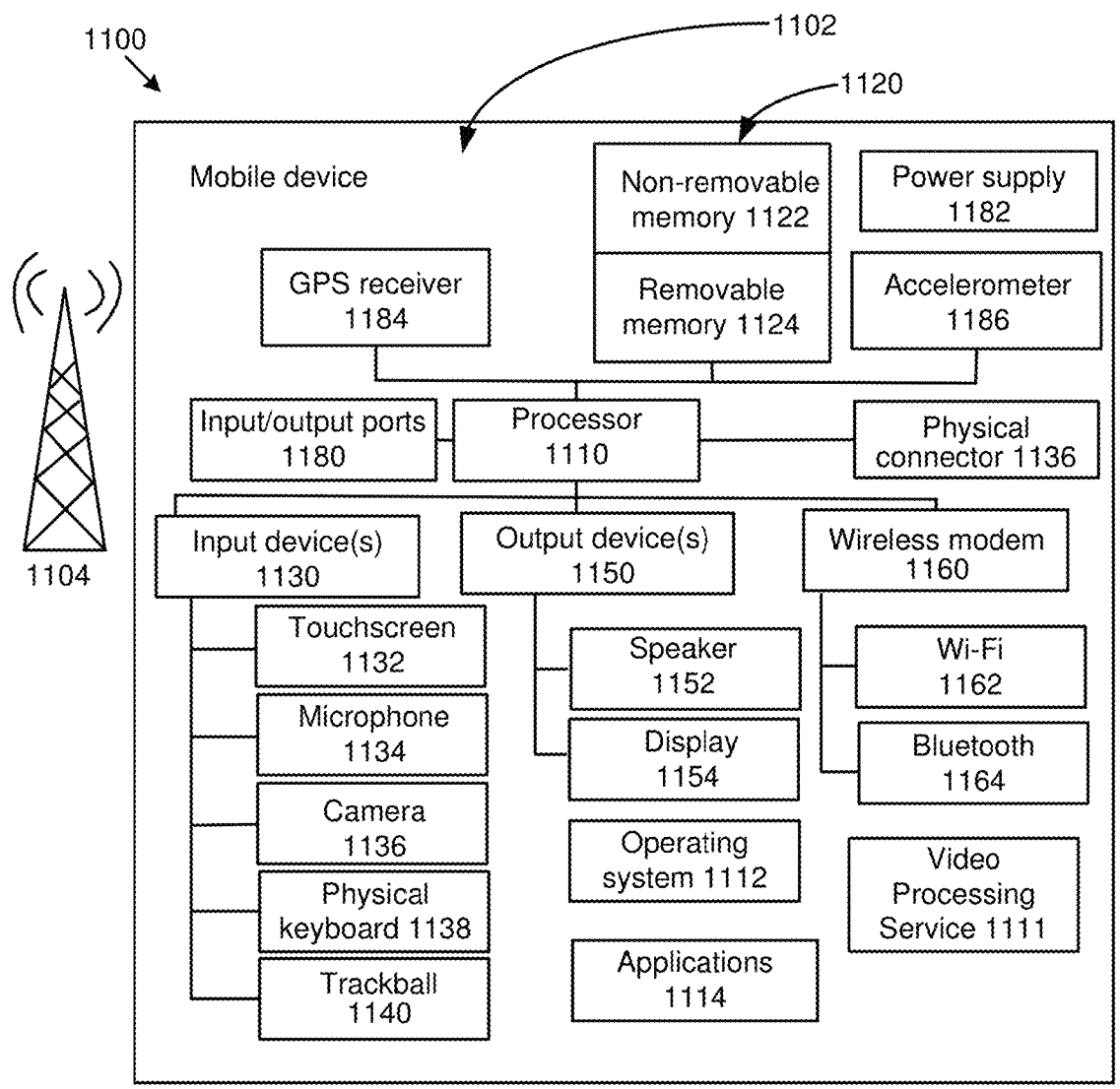
FIG. 11 is an example mobile device that can be used in conjunction with the technologies described herein.

FIG. 11 is an example mobile device that can be used in conjunction with the technologies described herein. Referring to FIG. 11, the example mobile device 1100 may include a variety of optional hardware and software components, shown generally at 1102. Any components 1102 in the mobile device 1100 can communicate with any other component, although not all connections are shown, for ease of illustration. The mobile device 1100 can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140, and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

In an example embodiment of the disclosure, the mobile device 1100 may further include a camera 1136 and a video processing service 1111. The video processing service 1111 may provide functionalities similar to the functionalities of the video processing service 512 in connection with panoramic view video share as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. By way of example and with reference to FIG. 11, computer-readable storage media may include memory and storage 1120, 1122, and 1124. The term "computer-readable storage media" does not include signals and carrier waves. In addition, the term "computer-readable storage media" does not include communication connections (e.g., 970, 1160, 1162, and 1164).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-readable storage medium having stored thereon computer-executable instructions operable to cause a receiving computing device to perform a method for constructing a live panoramic view from streaming digital video data, the method comprising:
   receiving at the receiving computing device, the streaming video data captured and generated by a transmitting computing device, the streaming video data comprising a plurality of video frames starting with a beginning video frame and concluding with a ending video frame;
   detecting a start indicator associated with a first video frame of the plurality of video frames, and an end indicator associated with a subsequent second video frame of the plurality of video frames, wherein the start indicator is subsequent to the beginning video frame and the end indicator is preceding the ending video frame;
   updating, in real-time, a panoramic view stored at the receiving computing device based on video data within at least one of the plurality of video frames streamed between the first and second video frames;
   displaying on a display of the receiving computing device, a current version of the panoramic view while receiving the streaming video data; and
   sending in real-time, a video stream of at least a portion of the current version of the panoramic view to the transmitting computing device.

2. The computer-readable storage medium according to claim 1, further including:
   receiving the start indicator with the first video frame of the plurality of video frames; and
   receiving the end indicator with the second video frame of the plurality of video frames.

3. The computer-readable storage medium according to claim 1, further including:
   receiving input at the computing device associating the start indicator with the first video frame of the plurality of video frames, and associating the end indicator with the second video frame of the plurality of video frames.

4. The computer-readable storage medium according to claim 1, further including:
   upon detecting the start indicator, initializing the panoramic view to be the same as the first video frame of the plurality of digital images.

5. The computer-readable storage medium according to claim 4, further including:
   for each of the plurality of video frames received after the first video frame and prior to detecting the end indicator:
      determining a location of the received video frame within the panoramic view;
      updating the panoramic view with the received video frame based on the determined location; and
      displaying the updated panoramic view.

6. The computer-readable storage medium according to claim 5, wherein the updating further includes expanding the panoramic view with video data from the received video frame.

7. The computer-readable storage medium according to claim 5, wherein updating the panoramic view with the received video frame is further based on at least one noise characteristic of the received video frame.

8. The computer-readable storage medium according to claim 1, wherein the streaming video data comprises one of real-time streaming video data or recorded video data, and the method further comprises:
   receiving at the computing device, the streaming video data with corresponding audio data, wherein the audio data is generated at the time the streaming video data is recorded; and
   displaying the panoramic view with the corresponding audio data.

9. The computer-readable storage medium according to claim 1, wherein the video stream of at least a portion of the current version of the panoramic view is sent from the receiving computing device to the transmitting computing device for display at the transmitting computing device in a picture-in-picture window.

10. A receiving computing device, comprising:
   a processor;
   a memory; and
   a display;
   the receiving computing device configured to perform operations for constructing a live panoramic view from streaming digital video data, the operations comprising:
      receiving at the receiving computing device, the streaming video data captured and generated by a transmitting computing device, the streaming video data comprising a plurality of video frames starting with a beginning video frame and concluding with a ending video frame;
      detecting a start indicator associated with a first video frame of the plurality of video frames, and an end indicator associated with a subsequent second video frame of the plurality of video frames, wherein the start indicator is subsequent to the beginning video frame and the end indicator is preceding the ending video frame;
      updating, in real-time, a panoramic view stored at the receiving computing device based on video data within at least one of the plurality of video frames streamed between the first and second video frames;

displaying on a display of the receiving computing device, a current version of the panoramic view while receiving the streaming video data; and sending in real-time, a video stream of at least a portion of the current version of the panoramic view to the transmitting computing device.

11. The computing device of claim 10, the operations further comprising:

upon detecting the start indicator, initializing the panoramic view to be the same as the first video frame of the plurality of digital images.

12. The computing device of claim 11, the operations further comprising:

for each of the plurality of video frames received after the first video frame and prior to detecting the end indicator:

determining a location of the received video frame within the panoramic view;

updating the panoramic view with the received video frame based on the determined location; and displaying the updated panoramic view.

13. The computing device of claim 12, wherein the updating further includes expanding the panoramic view with video data from the received video frame.

14. The computing device of claim 12, wherein updating the panoramic view with the received video frame is further based on at least one noise characteristic of the received video frame.

15. The computing device of claim 10, wherein the streaming video data comprises one of real-time streaming video data or recorded video data, and the method further comprises:

receiving at the receiving computing device, the streaming video data with corresponding audio data, wherein the audio data is generated at the time the streaming video data is recorded; and displaying the panoramic view with the corresponding audio data.

16. The computing device of claim 10, wherein the video stream of at least a portion of the current version of the panoramic view is sent from the receiving computing device to the transmitting computing device for display at the transmitting computing device in a picture-in-picture window.

17. A method, implemented by a receiving computing device, for constructing a live panoramic view from streaming digital video data, the method comprising:

receiving at the receiving computing device, the streaming video data captured and generated by a transmitting computing device, the streaming video data comprising a plurality of video frames starting with a beginning video frame and concluding with a ending video frame;

detecting a start indicator associated with a first video frame of the plurality of video frames, and an end indicator associated with a subsequent second video frame of the plurality of video frames, wherein the start indicator is subsequent to the beginning video frame and the end indicator is preceding the ending video frame;

updating, in real-time, a panoramic view stored at the receiving computing device based on video data within at least one of the plurality of video frames streamed between the first and second video frames;

displaying on a display of the receiving computing device, a current version of the panoramic view while receiving the streaming video data; and sending in real-time, a video stream of at least a portion of the current version of the panoramic view to the transmitting computing device.

18. The method of claim 17, the operations further comprising:

upon detecting the start indicator, initializing the panoramic view to be the same as the first video frame of the plurality of digital images.

19. The method of claim 18, the operations further comprising:

for each of the plurality of video frames received after the first video frame and prior to detecting the end indicator:

determining a location of the received video frame within the panoramic view;

updating the panoramic view with the received video frame based on the determined location; and displaying the updated panoramic view.

20. The method of claim 17, wherein the video stream of at least a portion of the current version of the panoramic view is sent from the receiving computing device to the transmitting computing device for display at the transmitting computing device in a picture-in-picture window.

* * * * *